Patented June 24, 1930

1,766,747

UNITED STATES PATENT OFFICE

RICHARD HERZ AND EDUARD ALBRECHT, OF FRANKFORT-ON-THE-MAIN, FECHENHEIM, GERMANY, ASSIGNORS TO GENERAL ANILINE WORKS, INC., OF NEW YORK, N. Y., A CORPORATION OF DELAWARE

PROCESS FOR MANUFACTURING VIC. TRIHALOGENBENZENES

No Drawing. Application filed September 29, 1928, Serial No. 309,351, and in Germany October 5, 1927.

Our present invention relates to a new process for manufacturing vic. trihalogenbenzenes. According to it halogen-aminobenzene-sulfonic acids corresponding to the formula:

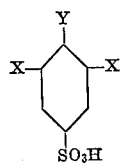

wherein Y means halogen or an aminogroup and the X's mean aminogroups in the case of Y being halogen, or halogen in the case of Y being an aminogroup, are diazotized and transformed into the trihalogenbenzene-sulfonic acids of the formula:

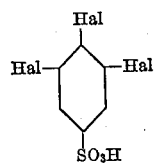

by means of Sandmeyer's reaction. Then these compounds are heated with sulfuric acid and yield thereby the vic. trihalogenbenzenes of the formula:

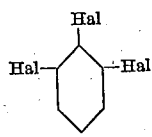

The reaction conditions of the second phase of our process are quite different from those of the hitherto known process, as we use advantageously temperatures of about 250–280° C. and a sulfuric acid of about 80–90% strength, whereas heretofore dilute sulfuric acid being further diluted by injecting steam at a temperature of about 170° C. was employed for splitting off sulfonic acid groups.

We observed the surprising fact that at the temperatures applied the trihalogenbenzene-sulfonic acids without being decomposed, distill together with the formed trihalogenbenzenes. In order to complete the reaction the distillate may be separated from the formed trihalogenbenzene and the remaining distillate containing the unattacked trihalogenbenzene-sulfonic acid may be brought back into the distillation process. In this manner the cyclic process of the distillation is continued until no more trihalogenbenzene nor trihalogenbenzene-sulfonic acid pass over. Thereby the trihalogenbenzenes are obtained in a nearly theoretical yield and in a chemically pure state. They may be used as starting material for the production of dyestuffs especially of those of the thioindigo series.

In order to further illustrate our invention the following examples are given, the parts being by weight and all temperatures in centigrade degrees; but we wish to be understood that our invention is not limited to the examples given, nor to the exact conditions stated therein.

Example 1

23 parts of 1-amino-2.6-dibromobenzene-4-sulfonic acid of the formula:

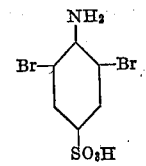

described in Liebig's Annalen, vol. 253, page 269, are diazotized in the usual manner and the diazocompound is treated with copperchloride according to Sandmeyer's reaction to form the 1-chloro-2.6-dibromobenzene-4-sulfonic acid of the formula:

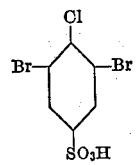

32.5 parts of the potassium salt of the sulfonic acid thus obtained are distilled with 200 parts of sulfuric acid of about 85% strength at 250–270°. The distillate is filtered from the formed product and the filtrate is brought back into the distillation process. In this manner the cyclic process of the distillation is continued until the distillate separates no more precipitate. The precipitate represents 1-chloro-2.6-dibromobenzene of the formula:

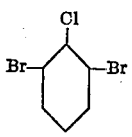

melting in a pure state at 69°.

When copper bromide is used in this example instead of copper chloride and the process is otherwise carried out in an analogous manner, 1.2.3-tribromo-benzene is obtained, melting at about 87°.

*Example 2*

22 parts of 1.3-diamino-2-chloro-benzene-5-sulfonic acid of the formula:

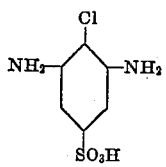

described in the German Patent No. 150,373 are tetrazotized in the usual manner and the tetrazocompound obtained is treated with copper chloride according to Sandmeyer's reaction to form the 1.2.3-trichlorobenzene-5-sulfonic acid of the formula:

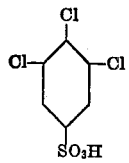

25 parts of the potassium salt of the sulfonic acid thus obtained are distilled with 200 parts of sulfuric acid of 85% strength at 250-270°. The distillation is carried out as a circle process in the same way as described in Example 1. Without any further purification the precipitate represents 1.2.3-trichlorobenzene of the formula:

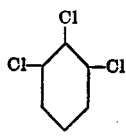

melting at 54° as described in Liebig's Annalen, vol. 192, page 234.

We claim:

1. Process which comprises diazotizing a halogenamino-benzene-sulfonic acid of the formula:

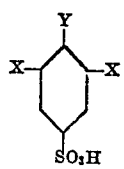

wherein Y means halogen or an aminogroup and the X's mean aminogroups in the case of Y being halogen, or halogen in the case of Y being an aminogroup, treating the diazocompound obtained with a copper halide according to Sandmeyer's reaction and heating the 1.2.3-trihalogenbenzene-5-sulfonic acid thus obtained with sulfuric acid.

2. Process which comprises diazotizing a halogen-amino-benzene-sulfonic acid of the formula:

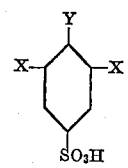

wherein Y means halogen or an aminogroup and the X's mean aminogroups in the case of Y being halogen, or halogen in the case of Y being an aminogroup, treating the diazocompound obtained with a copper halide according to Sandmeyer's reaction and heating the 1.2.3-trihalogenbenzene-5-sulfonic acid thus obtained with sulfuric acid of about 80-90% strength.

3. Process which comprises tetrazotizing 1.3-diamino-2-chlorobenzene-5-sulfonic acid of the formula:

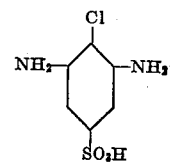

treating the tetrazocompound obtained with copper chloride according to Sandmeyer's reaction, distilling the 1.2.3-trihalogen-benzene-5-sulfonic acid thus obtained with sulfuric acid of about 80-90% strength in a cyclic process while separating the distilled 1.2.3-trichlorobenzene from the acid distillate and bringing back the latter into the distillation process.

In testimony whereof, we affix our signatures.

RICHARD HERZ.
EDUARD ALBRECHT.